United States Patent
Temoshenko et al.

(10) Patent No.: US 7,177,943 B1
(45) Date of Patent: Feb. 13, 2007

(54) SYSTEM AND METHOD FOR PROCESSING PACKETS IN A MULTI-PROCESSOR ENVIRONMENT

(75) Inventors: Leo Temoshenko, Raleigh, NC (US); Michael H. Otto, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 769 days.

(21) Appl. No.: 10/034,232

(22) Filed: Dec. 27, 2001

(51) Int. Cl.
*G06F 15/16* (2006.01)

(52) U.S. Cl. ............... 709/237; 709/227; 709/238; 709/250; 370/389; 370/390; 370/401; 370/432

(58) Field of Classification Search ............... 709/237
See application file for complete search history.

(56) References Cited

U.S. PATENT DOCUMENTS

| | | | | |
|---|---|---|---|---|
| 4,941,087 A | * | 7/1990 | Kap | 710/260 |
| 5,717,689 A | * | 2/1998 | Ayanoglu | 370/349 |
| 5,802,278 A | * | 9/1998 | Isfeld et al. | 709/249 |
| 6,122,274 A | | 9/2000 | Kumar | 370/388 |
| 6,222,820 B1 | * | 4/2001 | Hamami | 370/218 |
| 6,338,078 B1 | | 1/2002 | Chang et al. | 718/102 |
| 6,449,273 B1 | | 9/2002 | Jennings, III | 370/389 |
| 6,453,360 B1 | * | 9/2002 | Muller et al. | 709/250 |
| 6,631,422 B1 | | 10/2003 | Althaus et al. | 709/250 |
| 6,650,642 B1 | | 11/2003 | Sugai et al. | 370/392 |
| 6,691,165 B1 | | 2/2004 | Bruck et al. | 709/227 |
| 6,742,044 B1 | * | 5/2004 | Aviani et al. | 709/235 |
| 6,757,291 B1 | | 6/2004 | Hu | 370/401 |
| 6,778,496 B1 | | 8/2004 | Meempat et al. | 370/230 |
| 6,871,296 B2 | * | 3/2005 | Kashyap | 714/13 |
| 2002/0065938 A1 | * | 5/2002 | Jungck et al. | 709/246 |

* cited by examiner

*Primary Examiner*—Yves Dalencourt
(74) *Attorney, Agent, or Firm*—Baker Botts L.L.P.

(57) ABSTRACT

A method for processing packets in a multi-processor environment, that includes receiving a set-up request packet for a communication session and directing the set-up request packet to a selected one of a plurality of processors. A set-up reply packet is generated at the selected one of the plurality of processors, the set-up reply packet including a virtual identifier assigned to the selected one of the plurality of processors. The set-up reply packet is transported to establish the communication session.

20 Claims, 2 Drawing Sheets

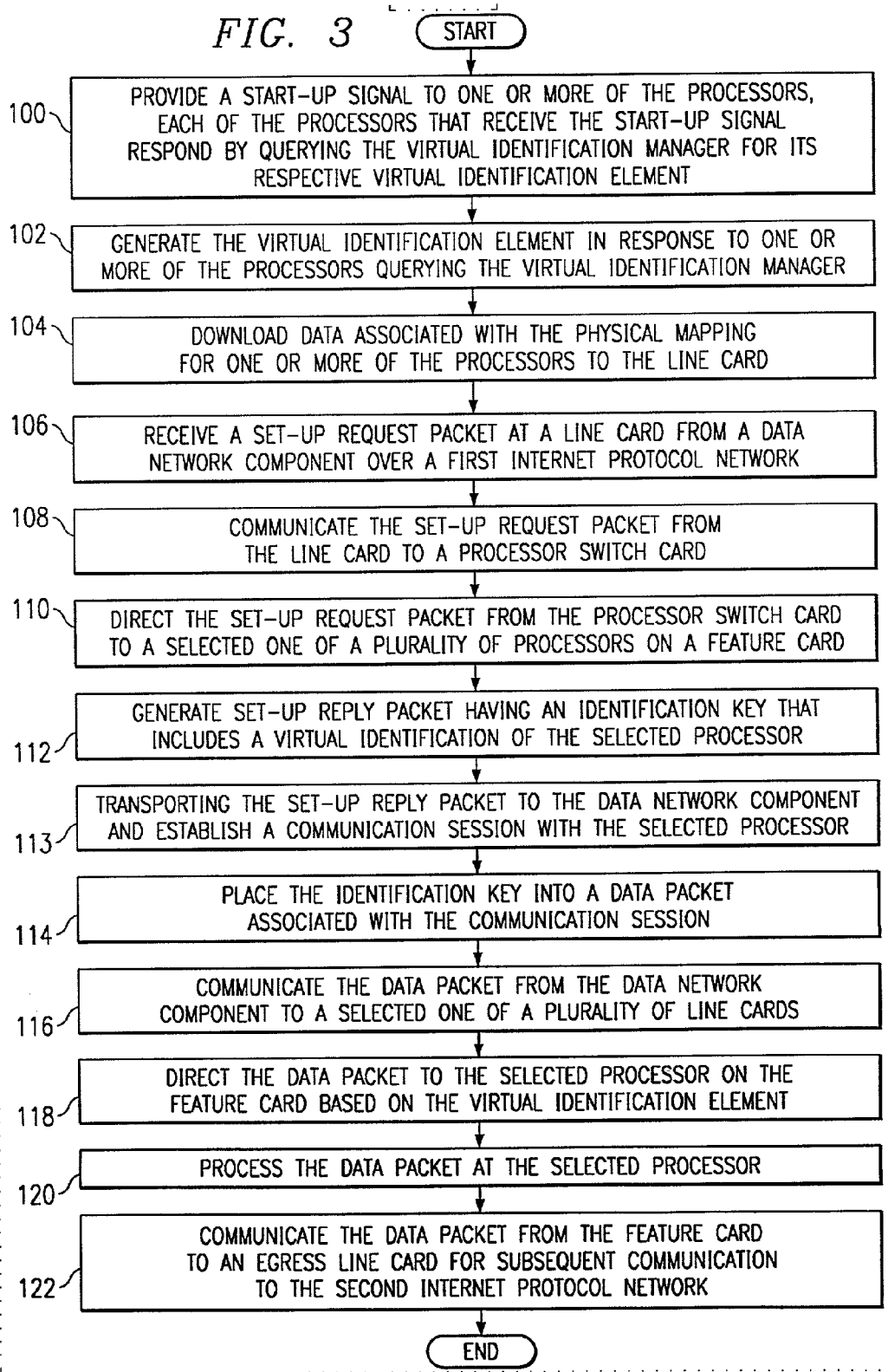

SYSTEM AND METHOD FOR PROCESSING PACKETS IN A MULTI-PROCESSOR ENVIRONMENT

TECHNICAL FIELD OF THE INVENTION

This invention relates in general to the field of computer communications and more particularly to a system and method for processing packets in a multi-processor environment.

BACKGROUND OF THE INVENTION

The field of communications has become increasingly important in today's society. One area associated with communications relates to the data exchange between two points or nodes, such as a mobile station and an internet protocol (IP) network, for example. Generally packets of information or data are routed in a communications environment during a session of communication, with selected packets being sent to specific destinations for suitable processing. The ability to differentiate these packets based on processing needs and further to accommodate varying types of packets within network communications is critical in providing high-speed and high-quality information exchange to end users participating in the communications session. Communication systems that lack an ability to execute effective routing techniques generally suffer from a number of deficiencies such as bottlenecks occurring at various parts of the network, slowed speed for an associated communications session, and an overall reduced bandwidth for the communication system.

SUMMARY OF THE INVENTION

From the foregoing, it may be appreciated by those skilled in the art that a need has arisen for an improved routing and processing capability for information propagating through an internet protocol (IP) network environment. In accordance with one embodiment of the present invention, a system and method for communicating packets in a multi-processor environment are provided which substantially eliminate or greatly reduce disadvantages and problems of conventional routing and processing techniques.

According to an embodiment of the present invention, there is provided a method for communicating packets in a multi-processor environment that includes receiving a set-up request packet for a communication session and directing the set-up request packet to a selected one of a plurality of processors. A set-up reply packet is generated at the selected one of the plurality of processors, the set-up reply packet including a virtual identifier assigned to the selected one of the plurality of processors. The set-up reply packet is transported to establish the communication session.

In a particular embodiment of the present invention, the method may further include receiving a data packet in the communication session and identifying the virtual identifier in the data packet. The data packet is directed to the selected one of the plurality of processors associated with the virtual identifier.

Certain embodiments of the present invention may provide a number of technical advantages. For example, according to one embodiment of the present invention, an information processing approach is provided that offers a significant reduction in the amount of memory needed for directing or routing information in an internet protocol network. This is due, in part, to the absence of packet lookup addresses that would otherwise be provided on each line card within the communications system. The identification key feature of the present invention allows a packet of information to be appropriately identified and sent directly to its corresponding processor. This feature of direct routing to a suitable processor also avoids unnecessary processing cycles on the line card in order to properly direct the data to its corresponding processor. In addition, this feature may also effectively reduce potential bottlenecks created when a line card is flooded with packets of data that require memory to process address management information in routing packets of information to a specific a processor.

Some embodiments of the present invention also provide the benefit of increased flexibility in the maintenance or the substitution of components or devices within a communications network. Because of the routing and processing protocol implemented in the network platform element of the present invention, the substitution, removal, or re-insertion of processors do not impact a communications session occurring within the network. This stand-alone or independent feature of the present invention is a result of the processor assignment and designation, which is assisted by the processor switch card that couples the line cards and the feature cards. Addressing information and management for the processors on the feature cards is handled in a uniform and consistent manner as new components or devices are introduced into the communications system.

Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of steps associated with a method for communicating in an IP environment.

DETAILED DESCRIPTION OF THE INVENTION

Figure 1:
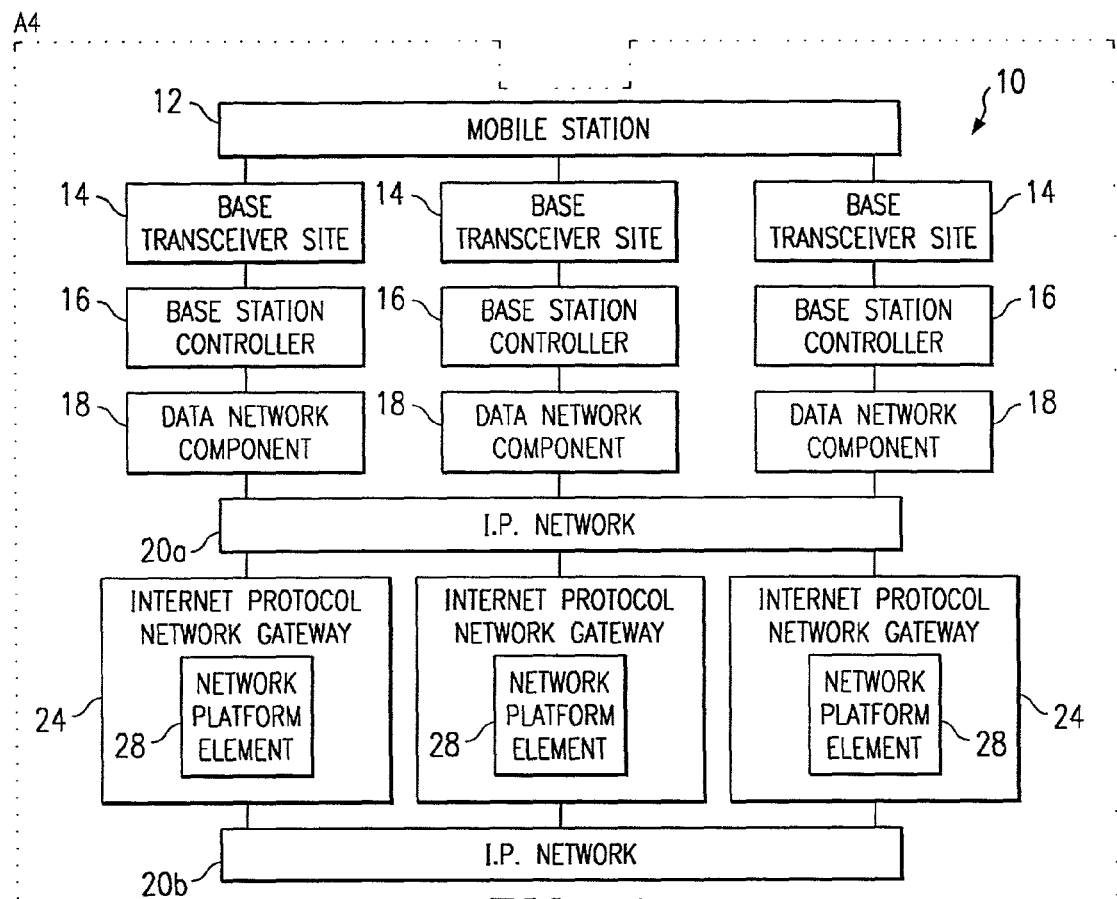
FIG. 1 is a simplified block diagram of a communication system that is operable to execute a communication session involving a mobile station and an internet protocol (IP) network.

FIG. 1 is a simplified block diagram of a communication system 10. Communication system 10 includes a mobile station 12, multiple base transceiver sites 14, multiple base station controllers 16, multiple data network components 18, a pair of internet protocol (IP) networks 20a and 20b, and multiple IP network gateways 24. These elements within communication system 10 cooperate in a network environment to transmit, receive, and process packets of information or data, such as transmission control protocol/internet protocol (TCP/IP) packets, for example. The data packets or information communicated through communication system 10 may be voice, data, or any other type of signal carrying information sought to be communicated between two points.

Mobile station 12 is a communications interface for an end user for communication with IP network 20a. Mobile station 12 may be a cellular (or other wireless) telephone, a computer, a personal digital assistant (PDA), or any other device, component, or object capable of initiating a voice or data exchange within communication system 10. In addition to executing radio or processing functions to access IP network 20a through a radio interface, mobile station 12 may also provide an interface to the human user, such as via a microphone, a display, or a keyboard or other terminal equipment (such as an interface to a personal computer, or to a facsimile machine in cases where mobile station 12 is used as a modem for example, etc.) where appropriate. An end user as referred to in this document generally represents a person wishing to initiate a data exchange within communication system 10. However, the end user may alternatively be a cellular component, a computer, a program, a database, or any other device, element, or object capable of initiating a voice or data exchange.

Mobile station 12 is coupled to multiple base transceiver sites 14. Base transceiver sites 14 are each transmit and receive interface links for communication system 10. Base transceiver sites 14 receive information from mobile station 12 in the form of data packets and communicate the data packets or information to corresponding base station controllers 16. Base station controllers 16 work in conjunction with base transceiver sites 14 to provide a link or interface between mobile station 12 and IP network 20a. Base station controllers 16 communicate data packets or information received from base transceiver sites 14 to corresponding data network components 18.

Data network component 18 is preferably a packet control function (PCF). However, data network component 18 may alternatively be any element capable of routing packets of information received from base station controllers 16 to IP network 20a. Data network component 18 may be included within a base station, where appropriate, to provide high-speed packet data communications between mobile station 12 and IP networks 20a and 20b. In a particular embodiment, the PCF is operable to communicate with a packet data serving node (PDSN), which may be provided in any suitable location, such as within IP network gateway 24 (as described in greater detail below).

In the embodiment where data network component 18 is a PCF, IP network gateways 24 may comprise a packet data serving node (PDSN). The PDSN may provide access to the internet, intranets, wireless application protocol (WAP) servers, or any other suitable platform or element for mobile station 12, which may be utilizing any one of a number of communications protocols. The PDSN may provide an access gateway for both mobile station 12 and IP networks 20a and 20b. The PDSN may also provide a foreign agent support and a packet transport for virtual private networking where appropriate. Additionally, the PDSN may operate to authenticate, authorize, and provide an accounting functionality for information propagating through communication system 10.

In a PDSN environment, set-up packets associated with a communication session between mobile station 12 and IP networks 20a and/or 20b may be referred to generally as A11 packets. In addition, in the PDSN environment, data packets associated with the communication session between mobile station 12 and IP networks 20a and/or 20b are referred to as A10 packets. Each of the A10 packets may comprise a generic routing encapsulation (GRE) key. One byte of the GRE key may hold a virtual identification (virtual ID) element in accordance with the teachings of one embodiment of the present invention. Because packets of information from the PCF (within data network component 18) to the PDSN (within internet protocol network gateway 24) are tunneled via a GRE protocol, the information packets may be provided with a suitable GRE tunneling key or identification which holds the virtual ID element. The virtual ID element provides a designation to a processor capable of facilitating the communication session between mobile station 12 and IP networks 20a or 20b.

In another embodiment of the present invention, data network component 18 is a serving general packet radio service (GPRS) support node (SGSN), providing a communications medium in a GPRS service network environment. Where communications system 10 is implemented in a Global System for Mobile (GSM) communications environment, IP network gateways 24 each include a gateway GPRS support node (GGSN) that works in conjunction with the SGSNs in communicating high-speed data exchanges within communication system 10.

GPRS represents a packet-based data bearer service for communication services that may be delivered as a network overlay for GSM, time division multiple access (TDMA) networks, and for any other type of suitable network or platform. GPRS generally applies packet radio and packet switching principles to transfer data packets in an efficient way between GSM mobile stations and external packet data networks. Packet switching occurs when data is split into packets that are transmitted separately and then reassembled at a receiving end. GPRS may support multiple internet communication protocols, and may enable existing IP, X.25, or any other suitable applications or protocols to operate over GSM connections.

A GSM environment generally provides an all digital cellular network for communications system 10 using TDMA techniques for multiplexing and using a transmission band in the range of 700–1200 MHz in accordance with one embodiment of the present invention. A GSM network may generally provide telephony services, short messaging services, data communication, in circuit and/or packet mode communications, and other suitable functions where appropriate. GSM signaling may use specific channels and protocols with voice communications being compressed and error correct algorithms being used.

In a GSM environment, data network component 18 includes an SGSN and IP network gateway 24 includes a GGSN. Packets of information propagating from the SGSN to the GGSN are tunneled via a GPRS tunneling protocol (GTP). Accordingly, the information packets may be provided with a suitable (GTP) tunneling key or ID, which holds the virtual ID element according to a particular embodiment of the present invention. The virtual ID element provides a designation to a processor capable of facilitating the communication session between mobile station 12 and IP networks 20a or 20b.

IP networks 20a and 20b each represent a series of points or nodes of interconnected communication paths for receiving and transmitting packets of information that propagate through communication system 10. IP networks 20a and 20b may be any local area network (LAN), metropolitan area network (MAN), wide area network (WAN), or any other appropriate architecture or system that facilitate communications in a network environment. IP networks 20a and 20b may implement a TCP/IP communication language protocol in a particular embodiment of the present invention. IP networks 20a and 20b may alternatively implement any other suitable communication protocol for transmitting and receiving data packets within communication system 10.

IP network gateway 24 is a communications interface positioned between two elements, such as IP network 20a and IP network 20b for example. IP network gateway 24 may comprise a series of voice or data gateways that receive signaling or data packets from mobile station 12. Alternatively, IP network gateway 24 may comprise networking components or elements operable to facilitate the communication of data packets within communication system 10. IP network gateway 24 includes a network platform element 28. Network platform element 28 provides a routing and a processing protocol for data packets communicated from data network component 18 to IP network 20*b*. Network platform element 28 may be used in a PDSN environment or a GGSN environment or with any other suitable communications protocol or system architecture that communicates data packets through communication system 10.

Figure 2:
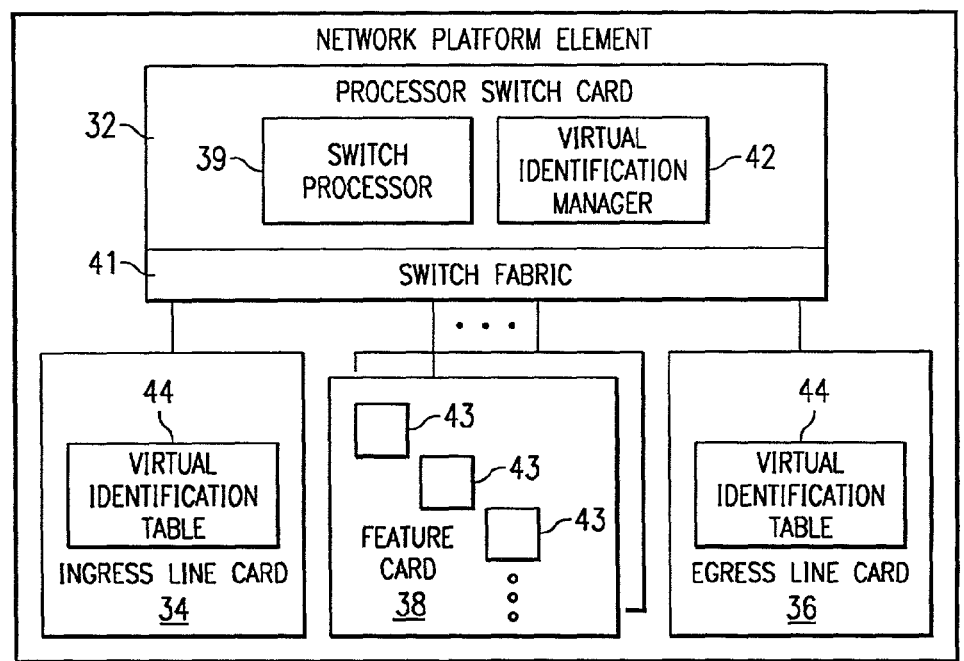
FIG. 2 is a block diagram of a network platform element that is included within the communication system.

FIG. 2 is a block diagram of network platform element 28, which is included within communication system 10 in accordance with one embodiment of the present invention. Network platform 28 comprises a processor switch card 32, an ingress line card 34, an egress line card 36, a feature card 38. Processor switch card 32 includes a switch processor 39 and a switching fabric 41, though each may be located on different cards. These elements cooperate to provide high-speed, efficient data propagation of information through network platform element 28. In addition, these elements may be appropriately configured in order to provide suitable routing and processing functions to communication system 10. Though specifically shown and described as respective ingress and egress units, ingress line card 34 and egress line card 36 may each have both ingress and egress capability. The usage of the terms "ingress" and "egress" has only been offered for purposes of teaching the present invention.

According to the teachings of the present invention, network platform element 28 operates to ensure that set-up packets of a respective communication session are communicated through processor switch card 32. Because of the routing and processing features of the present invention as described herein, data packets associated with the set-up packets move from ingress line card 34 to a corresponding feature card 38 over switching fabric 41 without intervention by switch processor 39 that operates to properly process the data packets and to communicate the processed data packets to egress line card 36 for communication out of network platform element 28. This provides a communication approach that significantly reduces the amount of memory needed for processing or routing of information within communication system 10. This is due to the absence of packet look-up addresses that are otherwise provided on each ingress line card 34 within communication system 10. This allows a data packet of information to be sent directly to suitable processors within one of the feature cards 38 without having to propagate through switch processor 39.

This direct routing to a suitable processor on one of the feature cards 38 avoids unnecessary processing cycles on ingress line card 34 that would otherwise be necessary to direct the data to its proper processor. In addition, this routing feature reduces potential bottlenecks created at ingress line card 34 or switch processor 39 when an abundance of data packets are flooded at network platform element 28. This addresses one problem in that all packets of information that are generally communicated within a communication architecture and going to the same processing element have the same address. This identification, designation, and further enhanced routing provides efficient direction of data packets communicated within communication system 10 despite the data packets having the same destination address. This is a result of the virtual identification elements being internally mapped to one or more physical processors within feature cards 38 as described below.

Processor switch card 32 includes a high-speed (for example 20 Gigabits/second) internal switching fabric 41 that couples ingress line card 34, feature card 38, and egress line card 36 in a particular embodiment of the present invention. Processor switch card 32 is capable of in excess of 500,000 communication sessions occurring within communication system 10. Switch processor 39 operates as a routing processor and may additionally provide suitable routing protocols, user interface designations, network management functions, overall management configuration elements, and other suitable functionalities where appropriate to communications system 10.

In a particular embodiment of the present invention processor switch card 32 includes a virtual identification (ID) manager 42. Virtual ID manager 42 is a storage element operable to store, organize, update, and access information relating to components, such as processors on feature cards 38 for example, within network platform element 28. Virtual ID manager 42 stores a plurality of virtual ID elements that may be identified, looked up, or otherwise accessed by processor switch card 32. Additional details related to the functionality of virtual ID manager 42 are provided below with reference to the discussion of ingress line card 34, feature card 38, and egress line card 36.

Ingress line card 34 is a network interface element operable to receive and transmit data packets to IP networks 20*a* and 20*b*. Ingress line card 34 is coupled to feature card 38 and processor switch card 32 (via the internal switching fabric as described above) and may communicate therebetween in accordance with one embodiment of the present invention. In a particular embodiment, ingress line card 34 includes virtual identification (ID) table 44 that provides a reference for ingress line card 34 to match incoming data packets with a processor within feature card 38 that is capable of suitably processing the data packet. Network platform element 28 may comprises multiple line cards 34 where appropriate, each of which may be suitably coupled to each feature card 38 and/or to processor switch card 32.

Feature card 38 may include multiple processors 43 (for example, six processors in a particular embodiment) that operate to process packets of information received by network platform element 28. Feature card 38 may execute or otherwise run a copy of any one of a number of suitable protocols (such as PDSN, GGSN, or cable, for example) according to which communications configuration is being implemented within communication system 10. This adaptability element of feature card 38 offers the benefit of scalability to communication system 10. Network platform 28 may comprise multiple feature cards 38 where appropriate, each of which may include processors operable to perform suitable processing of information received from ingress line card 34. In a particular embodiment of the present invention, feature card 38 may operate as a farm card in providing any number of processing functions to packets that are communicated within communication system 10. Alternatively, feature card 38 may include a single processor 43 operating to provide a specific functionality or operation for data packets received from ingress line card 34.

In operation, each of the processors 43 within feature card 38 may perform any one of a number of networking or processing functions. When power is provided to communication system 10 or a boot-up signal is received, each of the processors 43 of feature card 38 may be executing a copy of a PDSN or a GGSN protocol. At the boot-up or initiation stage, each processor 43 queries virtual ID manager 42 within processor switch card 32 for a virtual ID element. The virtual ID element is a number representative of a specific processor 43 on one of feature cards 38 within platform element 28 that will handle the communication session.

Each processor 43 receives a unique virtual ID element generated by virtual ID manager 42 of processor switch card 32 in response to a request made by each processor 43 during the boot-up phase. A physical mapping is then made between the virtual ID element number and the actual processor 43 residing on any one of a number of feature cards 38. During boot-up, this mapping information may be downloaded into ingress line card 34 and egress line card 36 via a pair of virtual identification tables 44 and 46. With this mapping information in place, a set-up packet request enters ingress line card 34 and indicate that a new communication session is being created within communication system 10. The set-up request packet moves from ingress line card 34 to processor switch card 32.

Switch processor 39 selects a processor 43 to handle the communication session associated with the set-up request packet. Once the communication session has been created, data packets, in the form of A10 packets in a PDSN environment for example, begin entering ingress line card 34 and are directly routed to a specific processor 43 on a feature card 38 according to the virtual ID element number in the packet.

Each of the processors 43 within feature card 38 communicate an identification key to data network component 18 for use in sending data packets to a respective processor 43. The identification key includes an appropriate virtual ID element and is transported in a set-up reply packet in response to the set-up request packet. In a particular embodiment in which communication system 10 implements a PDSN protocol, each processor 43 communicates a GRE identification key to the PCF within data network component 18 for use in sending data packets to a respective processor 43. In the case where communication system 10 implements a GGSN protocol, each processor 43 within feature card 38 communicates a GTP identification key to an SGSN within data network component 18. The SGSN utilizes the GTP identification key in sending data packets to a respective processor 43.

Each of the processors 43 may operate in the PDSN or GGSN environments, or both, to generate this identification key that gets sent through ingress line card 34 and to data network component 18. Thus, data network component 18 may use, place, or otherwise position the identification key in sending packets to ingress line card 34 within network platform element 28. When ingress line card 34 receives the data packet it accesses virtual identification table 44 and performs a quick identification that links the virtual ID element in the identification key with the physical identification of a suitable processor 43 that the data packet needs to be sent to on a feature card 38. In response, ingress line card 34 transmits the data packet directly to the corresponding feature card 38 that includes the appropriate processor 43.

Ingress line card 34 generally has its associated database (which may be included within virtual ID table 44 for example) populated or generated by processor switch card 32. Virtual ID manager 42 of processor switch card 32 generates a virtual ID element for each processor 43 in response to a query generated by each of the processors 43 on start-up that requested a virtual ID element. Egress line card 36 may similarly have its database (which may be included within virtual ID table 46 for example) be populated or otherwise generated by processor switch card 32.

Network platform element 28 may provide backup processors 43 to any one of a number of feature cards 38. The backup processor 43 may operate to generally mirror or otherwise monitor an active processor 43 within feature card 38 until the backup processor 43 recognizes a need to perform a takeover or to execute some type of assistance for the primary processor 43 already engaged. Several processors 43 may be implemented as backups to a primary processor 43 where appropriate or, alternatively, a single backup processor 43 may be used per communication session string or link between mobile station 12 and IP networks 20*a* and/or 20*b*.

Egress line card 36 is similar to ingress line card 34 and has been designated only as an egress line card for purposes of teaching the propagation of processed data packets communicated from egress line card 36 out of network platform element 28. Egress line card 36 operates to receive and to transmit data packets propagating from feature card 38 and in a particular embodiment includes virtual ID table 46 (as described above). Virtual ID table 46 is similar to virtual ID table 44 and operates to provide a reference for the matching of processors 43 with virtual ID element numbers that are included within data packets received by network platform element 28.

FIG. 3 is a flowchart illustrating a series of example steps for processing information propagating through communications system 10 in accordance with one embodiment of the present invention. The method begins at step 100 where a start-up signal is provided to one or more of the processors 43 included within feature card 38. Each of the processors 43 that receive the start-up signal respond by querying virtual ID manager 42 within processor switch card 32 for its respective virtual ID element.

At step 102, the virtual ID element is generated by virtual ID manager 42. The virtual ID element represents a value that designates a processor 43 that will handle specific communications sessions, i.e. a physical mapping for each processor 43 included within feature cards 38. The virtual ID element is communicated to the selected processor 43 in response to the query from processors 43 on feature cards 38 sent to virtual ID manager 42. Ingress line card 34 and egress line card 36 may then receive or otherwise download data associated with the physical mapping for one or more of the processors 43 on feature cards 38, i.e. their respective databases are populated. This is illustrated at step 104 in FIG. 3 and completes the initiating or start-up phase of the illustrated embodiment.

At step 106, a set-up packet request is received at ingress line card 34 from a first IP network, such as IP network 20*a* for example, from data network component 18. The set-up request packet initiates a communication session between IP network 20*a* and IP network gateway 24 and its network platform element 28. The set-up request packet may be communicated from ingress line card 34 to processor switch card 32 (step 108), which directs the set-up request packet to a corresponding selected processor 43 on one of the feature cards 38 (step 110).

The selected receiving processor 43 generates a set-up reply packet having an identification key, such as a GRE key or a GTP tunneling key for example, to be communicated to data network component 18, which is coupled to IP network 20*a*. This is illustrated as step 112. The identification key includes the virtual ID element assigned to the selected receiving processor 43 as described above. At step 113, the set-up reply packet is transported to data network component 18 to complete the establishment of the communication session.

Data network component 18 places or otherwise positions the identification key into a data packet associated with the communication session that was initiated by the set-up packet. At step 116, the data packet is communicated from data network component 18 to a selected one of a plurality of line cards, such as ingress line card 34 for example. At step 118, the data packet is directed by ingress line card 34 to the selected processor 43 on feature card 38 based on the virtual ID element contained within the data packet. The data packet is processed at the selected processor 43 at step 120. At step 122, the processed data packet is communicated from feature card 38 to egress line card 36 for subsequent communication to IP network 20b. The processed data packet includes the virtual identification element, which provides the identity of the selected processor 43 handling this communication session. Egress line card 36 may communicate the processed packet to any suitable destination for additional processing or subsequent communication where appropriate.

A backup processor 43 may be assigned to the communication session in the event of a failure in the primary processor 43 handling the communication session. There may also be suitable backing or failover support for backup processor 43. Backup processor 43 may be assigned the same or different virtual ID elements. If assigned the same virtual ID element, virtual ID manger 42 includes an indication that the primary processor 43 is the first option to handle the packet received in the communication session. This indication is included in the download or communication of virtual ID element associations provided to ingress line card 34 and egress line card 36. A packet received at ingress line card 34, having this same virtual ID element, is directed to the primary processor 43 by virtual ID table 44. In the event of a failure in primary processor 43, its virtual ID element association is removed from virtual ID manager 42 and virtual ID table 44. The indication may be adjusted to show that backup processor 43 is now the first choice in handling the communication session and all packets in the communication session having the same virtual ID element are now directed to backup processor 43. Backup processor 43 may receive all state information for the communication session from primary processor 43 so that a smooth and transparent transition takes place during the execution of engaging backup processor 43. If primary processor 43 subsequently becomes operational, it may be assigned a new virtual ID element or it may be assigned the same virtual ID element and act as a backup processor 43.

If backup processor 43 has a different virtual ID element than primary processor 43, the associated different virtual ID element may be included in the set-up reply packet and subsequent data packets. Virtual ID manager 42 may include a link between the virtual ID element and primary processor 43 and the virtual ID element of backup processor 43. Virtual ID manager 42 may provide an active/standby relationship between primary processor 43 and backup processor 43. As long as primary processor 43 is operational, data packets will be sent to primary processor 43 in response to its virtual ID element being contained therein as determined by virtual ID table 44. If primary processor 43 goes down or fails, the link between primary processor 43 and backup processor 43 ensures that data packets having the virtual ID element of primary processor 43 are directed to backup processor 43. If the set-up reply packet and data packets do not include the virtual ID element of backup processor 43, backup processor 43 may replace the virtual ID element of primary processor 43 with its own virtual ID element in a reply so that subsequent data packets received have the virtual ID element of backup processor 43 for direct mapping coordination.

Communications system 10 may be used in a host of communications environments, such as in conjunction with a CDMA protocol (as described above) for example. In a CDMA environment all users of the CDMA system use the same carrier frequency and may transmit simultaneously. Each user has his own pseudo-random code word. Whenever mobile station 12 using CDMA wishes to transmit, an associated system may correlate a message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in providing a faster processing protocol for information packets. IS-95 may use the CDMA scheme in conjunction with the present invention.

TDMA represents another protocol in which the disclosed processing approach involving communication system 10 may be implemented. In a TDMA access scheme, a set of end users or multiple mobile stations 12 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel with N time slots making up a frame. In using TDMA it is possible to allocate different numbers of time slots per frame to different end users. Thus bandwidth can be supplied on demand to different users depending on user needs. GSM and the IS-54/IS-136-based United States Digital Cellular (USDC) system are some of the standards that may use TDMA in conjunction with the present invention. The processing approach of information propagating through communications system 10, as discussed in FIGS. 1 through 3, may be implemented in a TDMA system in order to eliminate unnecessary signaling and redundant tunneling where appropriate.

Frequency division multiple access (FDMA) represents another communications environment in which communication system 10 may be employed. The FDMA system assigns individual frequency channels or bands to individual users wherein all users may transmit at the same time. These channels are assigned on demand to users requesting service. During the call no other user can share the same frequency band. An FDMA channel carries only one communications exchange, e.g. phone call, at a time. One or more mobile stations 12, which may be used in conjunction with an FDMA system, may implement duplexers because both the transmitter and receiver operate at the same time. The Advanced Mobile Phone Service (AMPS) and the European Total Access Communication System (ETACS) are some of the standards that may use FDMA in conjunction with the processing approach of the present invention as disclosed in FIGS. 1 through 3.

Although the present invention has been described in detail with reference to particular embodiments, it should be understood that various changes, substitutions, and alterations may be made hereto without departing from the spirit and scope of the present invention. For example, although the present invention has been described as operating in PDSN or GGSN environments, the present invention may be used in any communications environment that processes information packets. The processing protocol disclosed in the preceding figures is generally applicable to all communication systems in which information packets are routed between or through IP networks.

Additionally, although the present invention has been described with reference to communications between mobile station 12 and IP networks 20 and/or 20b, the processing protocol described herein may be implemented between any two components within or external to any mobile network. The present invention has merely described mobile station 12 and IP networks 20a and 20b for purposes of teaching the present invention. This should not be construed to limit how or where the processing protocol of the present invention is implemented. Moreover, the processing configuration disclosed above may be implemented in conjunction with any component, unit, hardware, software, object, or element involved in the communications process.

Numerous other changes, substitutions, variations, alterations, and modifications may be ascertainable by one skilled in the art and it is intended that the present invention encompass all such changes, substitutions, variations, alterations, and modifications as falling within the spirit and scope of the appended claims.

What is claimed is:

1. A gateway for processing packets in a multi-processor environment, comprising:
   a line interface operable to receive a set-up request packet;
   a switch processor operable to process the set-up request packet;
   a plurality of processors, the switch processor operable to direct the set-up request packet to a selected one of the plurality of processors, the selected one of the plurality of processors operable to generate a set-up reply packet in response to the set-up request packet, the set-up reply packet including a virtual identifier associated with the selected one of the plurality of processors as assigned by the switch processor, the selected one of the plurality of processors operable to transport the set-up reply packet through the line interface in order to establish a communication session with the selected one of the plurality of processors, the line interface operable to route subsequent packets associated with the communication session directly to the selected one of the plurality of processors in response to the virtual identifier without requiring initial processing by the switch processor wherein the switch processor includes a virtual identification manager, the virtual identification manager comprising one or more association of one or more virtual identifiers with one or more of the plurality of processors; and wherein the switch processor is operable to designate the associations between virtual identifiers and the plurality of processors to the line interface.

2. The system of claim 1, wherein the line interface is operable to receive an information request packet in the communication session, the information request packet including the virtual identifier, the line interface operable to direct the information request packet to the selected one of the plurality of processors associated with the virtual identifier.

3. The system of claim 2, wherein the selected one of the plurality of processors is operable to generate an information reply packet in response to the information request packet, the information reply packet including the virtual identifier.

4. The system of claim 1, further comprising:
   a switching fabric operable to route packets to the plurality of processors, the line interface operable to provide information packets received in the communication session to the switching fabric for routing to the selected one of the plurality of processors without directly engaging the switch processor.

5. The system of claim 1, wherein the switch processor selects a backup processor in addition to the selected one of the plurality of processors, the backup processor operable to process the communication session in response to a failure in the selected one of the plurality of processors.

6. The system of claim 5, wherein the backup processor is assigned a selected one of the virtual identifiers.

7. The system of claim 5, wherein the switch processor provides state information to the backup processor, the state information associated with the communication session associated with the selected one of the plurality of processors.

8. The system of claim 1, wherein each of the plurality of processors are operable to query the switch processor for an associated virtual identifier upon initialization.

9. A method for processing packets in a gateway having a multi-processor environment, comprising:
   receiving a set-up request packet for a communication session by a line interface;
   initially processing the set-up request packet to determine which of a selected one of a plurality of processors in the gateway is to handle the set-up request packet;
   generating a set-up reply packet at the selected one of the plurality of processors, the set-up reply packet including a virtual identifier assigned to the selected one of the plurality of processors by a switch processor; and
   transporting the set-up reply packet to establish the communication session;
   directly routing in the gateway subsequent packets associated with the communication session to the selected one of the plurality of processors in response to the virtual identifier without performing the initial processing wherein the switch processor includes a virtual identification manager, the virtual identification manager comprising one or more associations of one or more virtual identifiers with one or more of the plurality of processors; and wherein the switch processor is operable to designate the associations between virtual identifiers and the plurality of processors to the line interface.

10. The method of claim 9, further comprising:
   receiving a data packet in the communication session;
   identifying the virtual identifier in the data packet; and
   directing the data packet to the selected one of the plurality of processors associated with the virtual identifier.

11. The method of claim 9, further comprising:
   assigning a backup processor for the communication session; and
   inserting a virtual identifier of the backup processor into the set-up reply packet.

12. The method of claim 11, further comprising:
   receiving a data packet in the communication session;
   identifying the virtual identifier in the data packet;
   determining whether the selected one of the plurality of processors associated with the virtual identifier is operational; and directing the data packet to the backup processor in response to the selected one of the plurality of processors associated with the virtual identifier not being operational.

13. The method of claim 9, further comprising querying for an associated virtual identifier at each of the plurality of processors upon processor initialization.

14. A system for processing packets in a gateway having a multi-processor environment, comprising:
means for receiving a set-up request packet for a communication session;
means for initially processing the set-up request packet to determine which of a selected one of a plurality of processors in the gateway is to handle the set-up request packet;
means for generating a set-up reply packet at the selected one of the plurality of processors in response to the set-up request packet, the set-up reply packet including a virtual identifier assigned to the selected one of the plurality of processors; and
means for transporting the set-up reply packet to establish the communication session;
means for directly routing in the gateway subsequent packets associated with the communication session to the selected one of the plurality of processors in response to the virtual identifier without performing the initial processing means for determining a virtual identifier for each of the plurality of processors; means for receiving a data packet in the communication session; means for identifying the virtual identifier in the data packet; and means for directing the data packet to the selected one of the plurality of processors associated with the virtual identifier.

15. The system of claim 14, further comprising:
means for assigning a backup processor to the selected one of the plurality of processors;
means for determining an operational status of the selected one of the plurality of processors; and
means for directing the data packet to the backup processor in response to the selected one of the plurality of processors being in a non-operational state.

16. The system of claim 14, further comprising means for associating virtual identifiers with the plurality of processors.

17. A computer readable medium including code for processing packets in a gateway having a multi-processor environment, the code operable to:
receive a set-up request packet for a communication session;
direct the set-up request packet to a selected one of a plurality of processors in the gateway;
generate a set-up reply packet at the selected one of the plurality of processors, the set-up reply packet including a virtual identifier assigned to the selected one of the plurality of processors; and
transport the set-up reply packet to establish the communication session;
directly route in the gateway subsequent packets associated with the communication session to the selected one of the plurality of processors in response to the virtual identifier without performing the initial processing receive a data packet in the communication session; identify the virtual identifier in the data packet; and direct the data packet to the selected one of the plurality of processors associated with the virtual identifier.

18. The computer readable medium of claim 17, further operable to:
assign a backup processor for the communication session; and
insert a virtual identifier of the backup processor into the set-up reply packet.

19. The computer readable medium of claim 18, further operable to:
receive a data packet in the communication session;
identify the virtual identifier in the data packet;
determine whether the selected one of the plurality of processors associated with the virtual identifier is operational; and
direct the data packet to the backup processor in response to the selected one of the plurality of processors associated with the virtual identifier not being operational.

20. The computer readable medium of claim 17, further operable to query for an associated virtual identifier at each of the plurality of processors upon processor initialization.

* * * * *